May 17, 1949. R. HEISMAN 2,470,246
MECHANICAL MOVEMENT
Filed Sept. 14, 1946

Inventor
Robert Heisman
By Lyon & Lyon Attorneys

Patented May 17, 1949

2,470,246

UNITED STATES PATENT OFFICE 2,470,246

MECHANICAL MOVEMENT

Robert Heisman, Los Angeles, Calif.

Application September 14, 1946, Serial No. 697,019

6 Claims. (Cl. 74—32)

This invention relates to a mechanical movement and more particularly to an improvement in mechanism for converting unidirectional rotary motion into reciprocating rectilinear movement.

While hitherto devices have been proposed for converting unidirectional rotary movement into reciprocating rectilinear motion for such purposes as driving the pistons of reciprocating pumps, the valves of steam engines, or the flat beds of printing presses, the devices of the prior art have necessitated specially constructed elements, such as specially designed gear segments of controlled diameter and the like. The present invention contemplates such a mechanical movement employing conventional equipment not requiring special design or special tools to manufacture. The present invention also contemplates such a mechanical movement in which the mechanical parts are reduced to a minimum.

It is accordingly one object of this invention to provide a mechanical movement whereby unidirectional rotary motion is converted into reciprocating rectilinear motion, which mechanical movement employs conventional gear and rack elements.

It is a further object of this invention to provide such a mechanical movement in which the length of the rectilinear stroke can be altered simply by adding or subtracting teeth from one of the elements.

It is a further object of this invention to provide such a mechanical movement in which the speed may be doubled without changing the speed of the driving means.

It is a further object of this invention to provide such a mechanical movement adapted to employ gear elements of varying sizes.

Further objects and advantages appear hereinafter in the specification in which.

Figure 2:
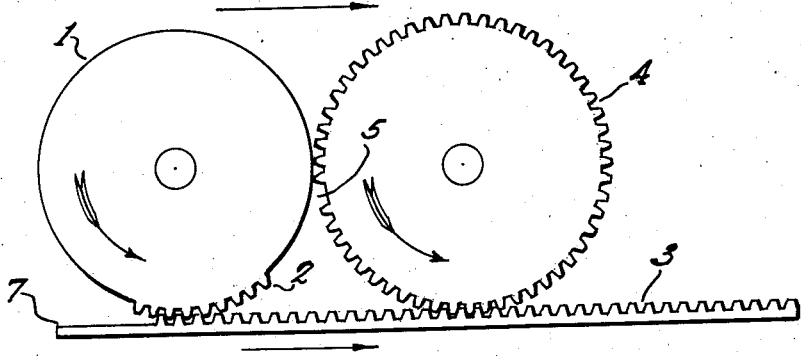
Figure 2 is a view similar to Figure 1 showing the movement in alternate position.

Referring now more particularly to the drawings, there is illustrated a mechanical movement adapted to convert unidirectional rotary motion into reciprocating rectilinear movement comprising a driven segmental or mutilated gear 1 having a segmental gear portion 2 thereon adapted to engage a spur rack 3. An idler gear 4 is provided meshed with the rack 3 as shown. One or more teeth may be removed from the idler gear 4 as at 5 for a purpose hereinafter described. Furthermore, the rack 3 is mutilated as at 6 by the removal of a controlled number of teeth. The segmental gear 1 is driven preferably at a constant speed and, when in the position shown in Figure 3, meshes with the idler gear 4 causing the idler gear to rotate throughout a portion of a cycle. The length of the arc thus imparted to the idler gear 4 is controlled by the number of teeth on the segmental gear 1 engaging with teeth on the idler gear 4. On further rotation of the segmental gear 1, the tooth portion 2 thereof will engage the rack, as shown in Figure 2, driving the rack in a rectilinear direction, as shown by the arrow in Figure 3. Due to the fact that the gear teeth in the tooth section 2 of the segmental gear 1 will approach and depart from the rack 3 in what may be termed lineal departure, whereas the teeth section 2 will approach and depart from the idler gear 4 in what may be termed radial departure, the rack 3 will normally be driven by the gear 1 a greater distance than would the idler gear 4. As the idler gear 4 serves during the time it is driven by the driven gear 1 to return the rack on its return stroke, this would result in returning the rack 3 a shorter stroke than it was driven by the driven gear 1. In order to compensate for this factor, a portion of the rack 3 is mutilated as at 7 by the removal of teeth therefrom to shorten the stroke imparted by the driven gear 1. As clearly shown in Figure 2, this causes one or more of the teeth on the segmental gear section 2 of driven gear 1 to fail to engage a corresponding tooth on the rack 3 and in this manner the inequality of the stroke is removed. In order to achieve smoothness of movement, one of the teeth of the idler gear 4 may be removed, as shown at 5, assuring that the lead tooth of the tooth section 2 of the segmental gear 1 will engage the proper tooth of the idler gear 4 without interference.

In the operation of the mechanical movement of this invention, the driven gear 1 is rotated in a counterclockwise direction, causing the tooth section 2 thereof to engage mating teeth in the rack 3, thus driving the rack 3 to the right, as shown in the figures. The tooth section 2 will then pass off of the rack, the last one or two teeth failing to engage a mating tooth on the rack 3, as shown in Figure 2. After the tooth section 2 has passed from engagement with the rack, the lead tooth thereof will engage a tooth of the idler gear 4 adjacent the mutilated portion 5, thus causing the idler gear 4 to rotate in a clockwise direction. Continuing, the tooth section 2 of the segmental gear 1 will disengage the idler gear 4 and the device will be at rest until the tooth section 2 again engages the rack 3. It will be appreciated that during the period of time that the tooth section 2 engages and drives the rack 3, the idler gear 4 is driven in a counter-clockwise direction, returning the gear to a position where the mutilated section 5 is in a proper position for engagement with the lead tooth of the tooth section 2.

In a mechanical movement as hereinbefore described, great flexibility can be achieved very simply. It is not at all necessary that the idler gear and the driven gear be of the same diameter, but they may vary in size. Furthermore, the length of the stroke may be increased or decreased simply by adding or subtracting teeth from the tooth section 2 of the driven gear. Furthermore, each of the gears 1 and 4 may be conventional and manufactured by conventional means or purchased from existing stocks. Also the rack 3 is entirely conventional except for the removal of teeth in the mutilated section 5.

It will be appreciated that the idler gear 4 may be a full gear or in the alternative may have a segmental gear portion 11, the rest of the gear being blank. In the embodiment shown in Figures 1, 2 and 3 the only working part of the idler gear 4 is said segmental portion 11.

Figure 1:
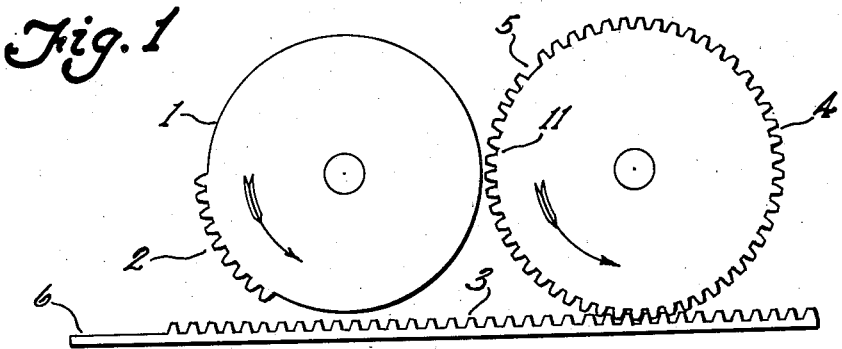
Figure 1 is a front elevation of a mechanical movement embodying the present invention.
Figure 3:
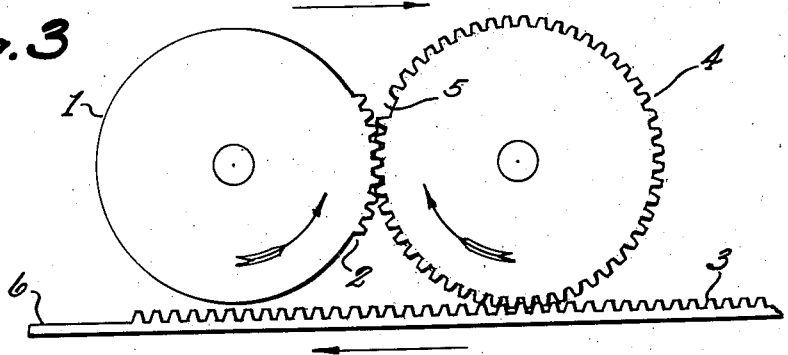
Figure 3 is a view similar to Figure 1 showing the movement in a third position.
Figure 4:
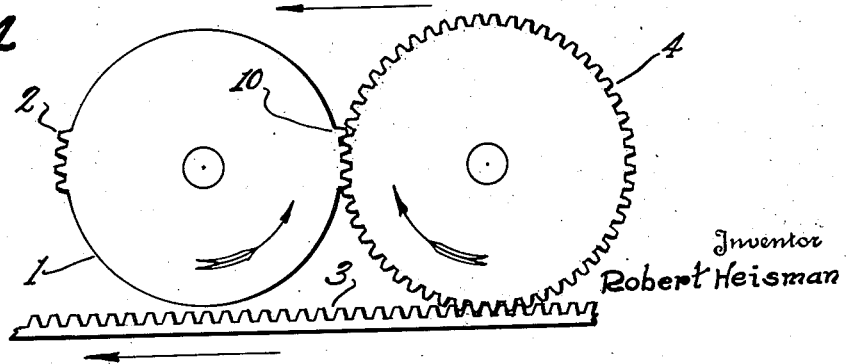
Figure 4 is a view similar to Figure 3 showing an alternative embodiment of the invention.

Referring now to Figure 4, there is illustrated an alternative embodiment of this invention differing only from the embodiments shown in Figures 1, 2 and 3 in that there is provided an additional segmental tooth section 10 on the driven gear 1 diametrically opposed to the section 2. It will be apparent that the section 10 functions in all respects entirely similarly to the section 2 and the result is simply a doubling of the speed of the reciprocation of the rack 3. While there has been illustrated in this embodiment a driven gear having two separate segmental tooth sections 2 and 10, it will be understood that in appropriate cases the number of such sections can be increased, say, to three, provided only that the segmental gear sections are short enough so that the function of one section is entirely completed before the ensuing section engages the rack 3.

While there has been described what is at present considered the preferred embodiment of the invention, it will be understood that various changes and modifications may be made therein without departing from the essence of the invention, and it is intended to cover herein all such changes and modifications as come within the true scope and spirit of the appended claims.

What is claimed is:

1. A mechanical movement comprising a driven segmental gear, a rack engaged by said segmental gear, and an idler gear constantly meshed with said rack and positioned to be engaged by said segmental gear after said segmental gear disengages said rack.

2. Mechanism for converting unidirectional rotary motion into reciprocating rectilinear motion comprising: a driven segmental gear, a rack positioned to be engaged by said segmental gear, and an idler gear constantly meshed with said rack and positioned to be engaged by said segmental gear after its engagement with said rack.

3. Mechanism for converting unidirectional rotary motion into reciprocating rectilinear motion comprising: a driven segmental gear, a rack positioned to be engaged by said segmental gear, and an idler gear constantly meshed with said rack and positioned to be engaged by said segmental gear after its engagement with said rack, said rack having a mutilated section in the region normally engaged by the last teeth of said segmental gear.

4. Mechanism for converting unidirectional rotary motion into reciprocating rectilinear motion comprising: a driven segmental gear, a rack positioned to be engaged by said segmental gear and driven in a rectilinear motion thereby, an idler gear constantly meshed with said rack and positioned to be engaged by said segmental gear after its engagement with said rack, and to be rotated thereby, whereby said idler gear drives said rack rectilinearly to its original position.

5. Mechanism for converting unidirectional rotary motion into reciprocating rectilinear motion comprising: a driven segmental gear, a rack positioned to be engaged by said segmental gear and driven in a rectilinear motion thereby, an idler gear constantly meshed with said rack and positioned to be engaged by said segmental gear after its engagement with said rack, and to be rotated thereby, whereby said idler gear drives said rack rectilinearly to its original position, said rack having a mutilated section in the region normally engaged by the last teeth of said segmental gear.

6. Mechanism for converting unidirectional rotary motion into reciprocating rectilinear motion comprising: a driven segmental gear, said gear having a plurality of gear segments formed thereon, a rack positioned to be engaged by said segmental gear and driven in a rectilinear motion thereby, an idler gear constantly meshed with said rack and positioned to be engaged by said segmental gear after its engagement with said rack, and to be rotated thereby, whereby said idler gear drives said rack rectilinearly to its original position.

ROBERT HEISMAN.

REFERENCES CITED

The following references are of record in the file of this patent:

UNITED STATES PATENTS

| Number | Name | Date |
| --- | --- | --- |
| 5,819 | Marsh | Oct. 3, 1848 |
| 939,063 | Myrholm | Nov. 2, 1909 |